Oct. 22, 1963  L. G. MUNSON  3,107,644
MEANS FOR ABSORBING TORSIONAL VIBRATIONS IN AN OUTBOARD MOTOR
Filed May 9, 1961  2 Sheets-Sheet 1
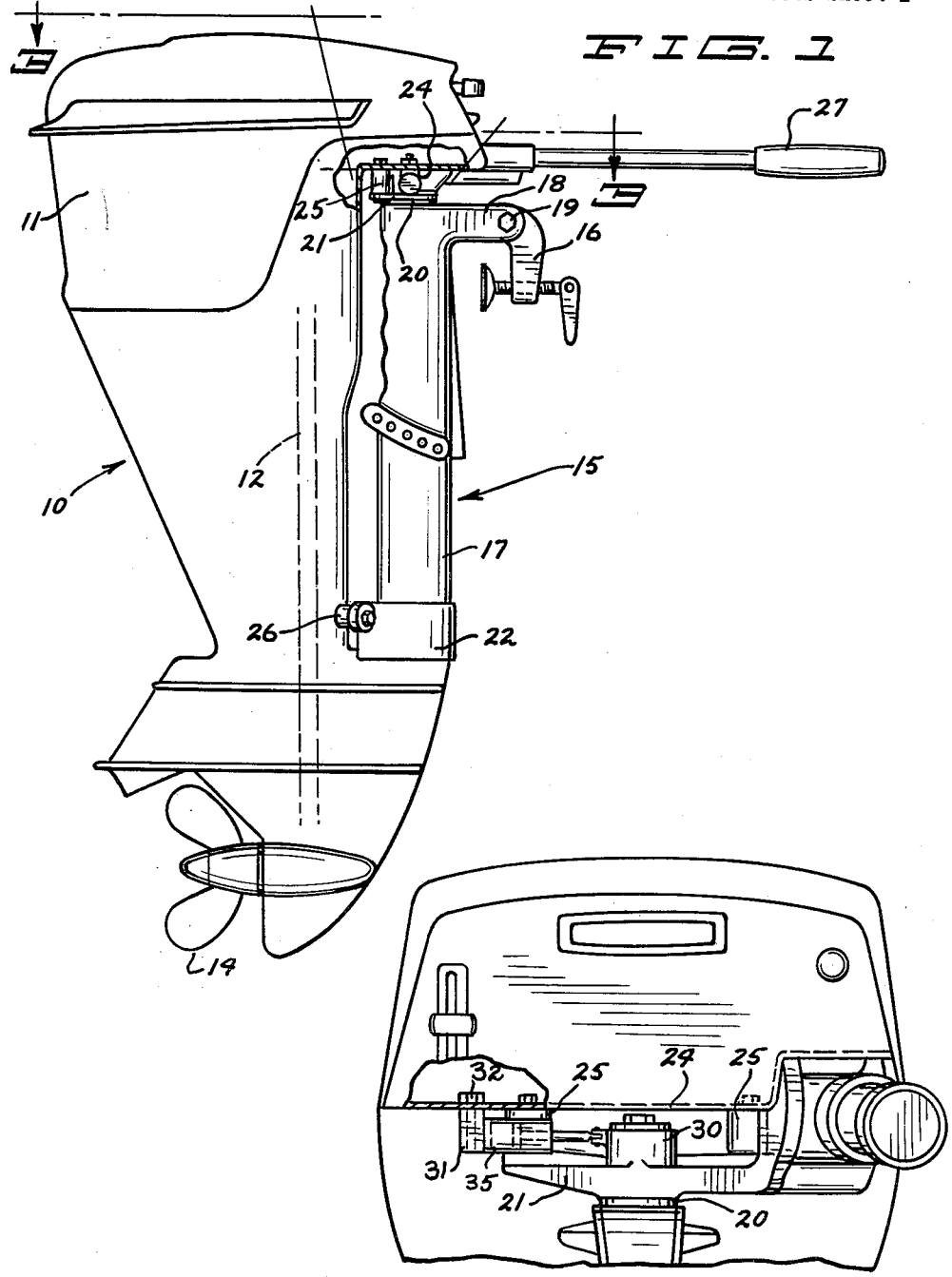
INVENTOR.
LYLE G. MUNSON
BY
Carlsen + Carlsen
ATTORNEYS Oct. 22, 1963   L. G. MUNSON   3,107,644
MEANS FOR ABSORBING TORSIONAL VIBRATIONS IN AN OUTBOARD MOTOR
Filed May 9, 1961   2 Sheets-Sheet 2
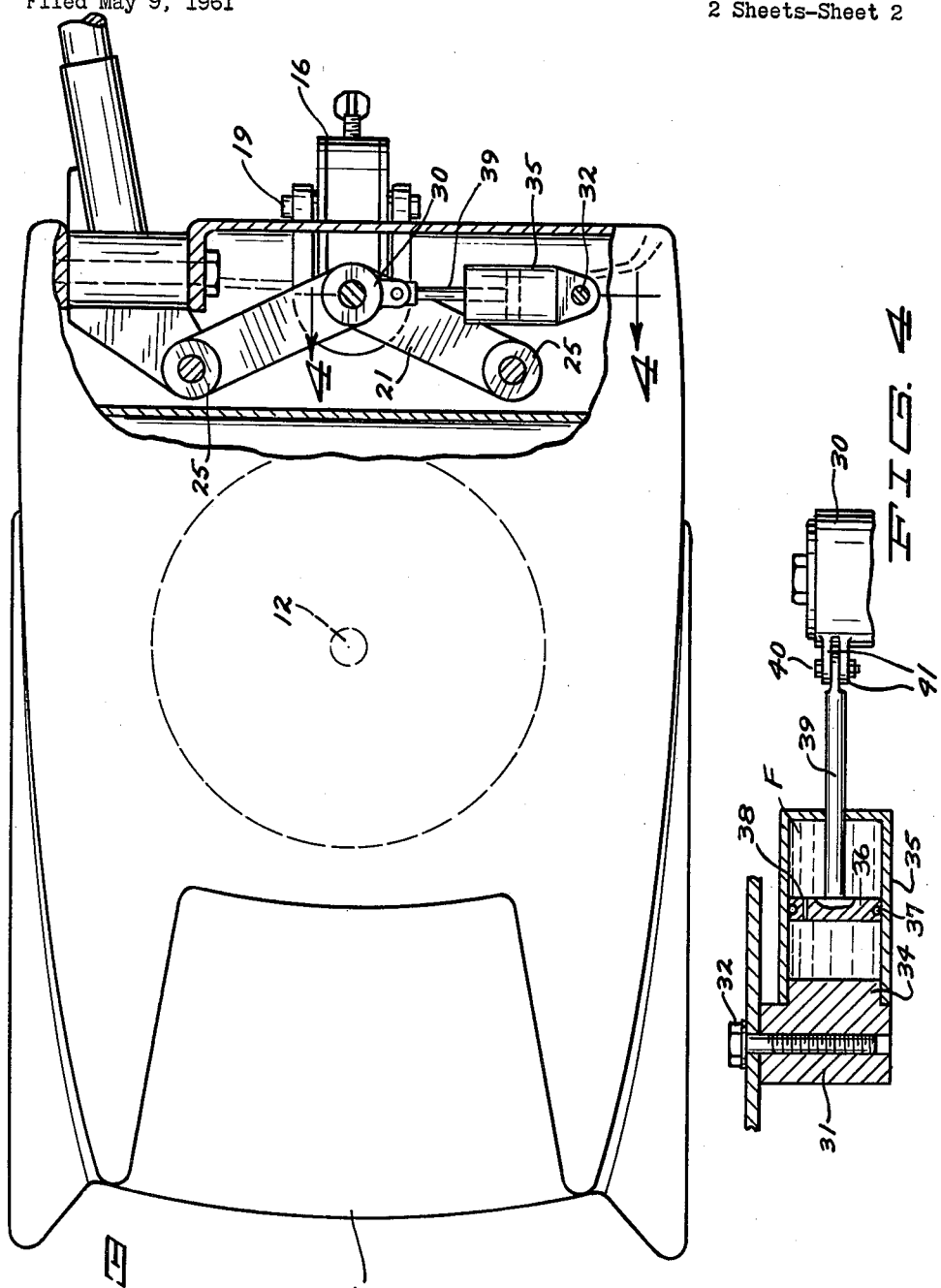
INVENTOR.
LYLE G. MUNSON
BY
Carlsen & Carlsen
ATTORNEYS

United States Patent Office 3,107,644
Patented Oct. 22, 1963

3,107,644
MEANS FOR ABSORBING TORSIONAL VIBRA-
TIONS IN AN OUTBOARD MOTOR
Lyle G. Munson, Minneapolis, Minn., assignor to
McCulloch Corporation, Scott Division, Minneapolis,
Minn., a corporation of Minnesota
Filed May 9, 1961, Ser. No. 108,819
3 Claims. (Cl. 115—18)

This invention relates to outboard motor vibration absorption means.

It is common practice in the manufacture of outboard motors to isolate the power unit from the mounting bracket by means of resilient springs or cushioning elements in order to reduce transmission of vibrations from the power unit to the boat on which the motor is mounted. This system of mounting is disclosed in Patent No. 2,740,368 which issued April 3, 1956, on an application filed by Finn T. Irgens and Lucius D. Watkins.

The problem of torsional vibration of an outboard motor is explained in the patent referred to in the following language (col. 3, lines 24–39):

"During parts of each crank shaft rotation, the fly wheel 30 is receiving power during the expansion strokes of the respective pistons in the respective cylinders. During other parts of each rotation, the fly wheel 30 is delivering power to the crank shaft during the compression strokes of the respective pistons. The resulting vibration is known as torsional vibration. It tends to cause the entire propulsion unit, consisting of the rigidly connected powerhead shaft housing and gear housing, to oscillate around a generally upright axis known as the neutral axis. In previous outboard motor designs, it has generally been assumed that this axis coincides with the axis of drive shaft 22. It may in fact be offset materially from the drive shaft axis toward the center of mass of the unit and it is not even necessarily parallel to the drive shaft axis."

The patent then goes on to disclose a system utilizing elastic springs having a low natural frequency and with the torsional vibrations occurring in the direction of shear of the springs. These springs while having a low resistance to displacement in the direction of shear do have a resiliency in this direction and thus do not fully absorb the torsional vibrations but rather store them.

The object of the present invention is to provide a damping means between the power unit and the motor mounting bracket adapted to absorb and dissipate the torsional vibrations of the power unit.

Another object of the invention is to provide an outboard motor construction wherein the weight and forward thrust of the motor power unit are transmitted to the motor mounting bracket through resilient cushioning means and the torsional vibrations of the motor are isolated from the mounting bracket by a vibration absorbing damping device.

With these objectives in mind the invention broadly comprises combining the conventional resilient mounting of an outboard motor power unit on a boat bracket with a viscous damper positioned between the unit and bracket on an axis extending substantially tangential to the upright neutral axis about which the power unit torsionally vibrates to absorb such torsional vibrations.

The above mentioned and other objects of the invention will be brought to light during the course of the following specification, reference being made to the accompanying drawings, in which—

FIG. 1 is a side elevation of an outboard motor showing the resilient connection between the powerhead and the combination boat and steering bracket.

FIG. 2 is a front elevation of the upper portion of the motor showing the horizontal position of the torsional vibration damping mechanism.

FIG. 3 is a plan view of the motor partially broken away to show the position of the damping mechanism relative to the axis of torsional vibration of the power unit.

FIG. 4 is an enlarged detail section of the damping mechanism taken along line 4—4 of FIG. 3.

Referring now more particularly to the drawings reference characters will be used to denote like parts and structural features in the different views. An outboard motor power unit is designated generally by the numeral 10. Unit 10 has a powerhead enclosed within housing 11 for driving a drive shaft 12, the position of which is denoted by broken lines and which in turn is operatively connected to propeller 14 at the lower end of the unit for propelling the motor and the boat on which it is mounted through a body of water in conventional manner.

A power unit carrying assembly is designated generally by the number 15. This assembly includes a transom bracket 16, a bearing sleeve 17 having a portion 18 pivoted as at 19 to the bracket 16 for vertical swinging movement, and a steering pintle 20 journaled for rotation in sleeve 17. Pintle 20 has an integral cross bracket 21 (FIG. 2) at its upper end and integral laterally extending arms 22 at its lower end.

The power unit 10 is provided at its front side with a downwardly facing wall 24 which extends over the bracket 21 and which is supported thereover by the resilient cushioning elements 25 providing a yieldable connection between the power unit 10 and the carrying assembly 15. Similarly the lower portion of the power unit 10 is connected to the arms 22 by means of resilient cushioning elements 26.

The power unit carries a forwardly extending steering handle 27. It will be understood that in normal use the motor is mounted at the stern of the boat by securing the clamp 16 to the boat transom. By such mounting the assembly 15 becomes securely fixed to the boat with the steering pintle 20 rotatable on a fixed axis within the sleeve 17. The power unit 10 may be turned about the axis of pintle 20 by operation of handle 27 to vary the direction of forward thrust of propeller 14 relative to the boat transom for steering the boat in conventional manner.

The resilient members 25 and 26 serve to cushion the vibrations of the power unit from the boat bracket and accordingly from the boat on which the motor is mounted. Cushions 25 will, of course, take the weight of the power unit in compression and resist the vibrations resulting from piston movement in shear. Cushions 26 will take such vibration partially in compression and partially in shear. Both members 25 and 26 will take the aforementioned torsional vibrations of the power unit in shear.

While the cushioning elements preferably have a low natural frequency their resilient nature prohibits their complete absorption of the torsional vibration. It is accordingly found that by combining this resilient mounting system with a viscous damper having its damping axis disposed substantially tangential with respect to the motor neutral axis, the isolation system is greatly improved.

The damping mechanism and its mounting can best be observed in FIGS. 3 and 4. The steering pintle 20 extends upwardly beyond the bracket 21 as at 30. Horizontally and laterally spaced from portion 30 a block 31 is mounted on power unit wall 24 and held by a bolt 32 for limited pivotal movement about the axis thereof. Block 31 has a circular pluglike projection 34 which fits and is sealed peripherally within one end of a cylinder 35. A piston 36 carrying a sealing ring 37 is slidably disposed within the cylinder 35. This piston has a fluid bleed passage or vent 38 therein for passing fluid from one side of the piston to the other. A piston rod 39 connected to the piston 36 extends slidably out through the air opening in the wall of cylinder 35 opposite block 31 and the extended end of the rod 39 is pivoted as by bolt and nut assembly 40 between a pair of ears 41 projecting from the pintle 30. Cylinder 35 is filled with a fluid F and suitable sealing means (not shown) is provided around the cylinder opening through which rod 39 slides to prohibit fluid leakage from the cylinder.

As hereinbefore pointed out the neutral axis about which the power unit tends to vibrate is at the drive shaft 12 or somewhat to the rear thereof dependent upon the center of the motor mass. In any event the damper center axis, which in effect is the sliding axis of piston 36 within cylinder 35, is substantially tangential with respect to said neutral axis. This relationship becomes even more perfectly tangential during actual operation of the motor. This is due to the fact that during operation the forward thrust of the propeller 14 has a tendency to move the upper portion of the motor rearwardly about the mountings 26 thus causing the damping device to swing slightly rearward about the pivot 40 toward such tangential position.

It will be understood that with the resilient mounts 25 and 26 being subjected to steady vibration of the motor, the vibrational energy will be stored therein thus frequently causing problems of rather violent motor oscillation. The viscous damper has the effect of absorbing and dissipating this vibrational energy and limits the relative oscillating movement of the motor rather than allow it to increase as where the resilient mounts are used alone in the isolation system.

Here the movement of the motor, attached to the cylinder at 31, relative to the mounting bracket, attached to the piston at 40, is retarded or damped by the action of piston 36 in displacing the fluid F from one section of the cylinder 35 to the other. As the fluid is forced through the port 38 the energy of the vibration is dissipated.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In an outboard motor, a power unit adapted when operative to torsionally vibrate about a neutral axis, a power unit carrying assembly adapted to be attached to a boat transom, means resiliently mounting the power unit on the carrying assembly, a longitudinally extendable and contractible untensioned inelastic viscous damper adapted to absorb the shock of forces applied longitudinally thereto and rest in any length adjusted condition, and said damper longitudinally connecting the power unit and carrying assembly on a plane substantially tangential with respect to said neutral axis of vibration of the power unit.

2. In an outboard motor, a transom bracket, a steering pintle journaled on the transom bracket for turning about an upright axis, a power unit having a drive shaft, resilient means connecting the power unit to the steering pintle with the drive shaft generally parallel to the pintle, an inelastic viscous damper connecting the steering pintle to the power unit with the axis between the connected ends thereof lying substantially tangential to the drive shaft axis, and said damper comprising a fluid filled cylinder forming one connecting end of the damper, an unbiased piston freely slidable axially within the cylinder and connected to a rod extending through one end of the cylinder and forming the other connecting end of the damper, and said piston having a restricted passage therethrough for passage of the fluid from one side of the piston to the other responsive to axial force exerted upon the piston due to relative spreading or contracting movement of the connected ends of the damper.

3. In an outboard motor, a transom bracket, a steering pintle journaled on the transom bracket for turning about an upright axis, a power unit having a drive shaft, resilient means connecting the power unit to the steering pintle with the drive shaft generally parallel to the pintle, the power unit adapted when operative to torsionally vibrate about a neutral axis, and a vibration damping device having two movably but inelastically connected parts for absorption by the device of shock forces applied thereto, said parts being respectively connected at points spaced substantially perpendicular to said upright axis to the power unit and steering pintle allowing the power unit to come to rest at different positions relative to the pintle to which it may be shifted by such vibration.

References Cited in the file of this patent

UNITED STATES PATENTS

| | | |
|---|---|---|
| 2,393,110 | Kops | Jan. 15, 1946 |
| 2,605,734 | Watkins | Aug. 5, 1952 |
| 2,916,007 | Kiekhaefer | Dec. 8, 1959 |

FOREIGN PATENTS

| | | |
|---|---|---|
| 484,373 | Italy | Sept. 8, 1953 |